(12) United States Patent
Sannomiya et al.

(10) Patent No.: US 9,770,986 B2
(45) Date of Patent: Sep. 26, 2017

(54) USER INTERFACE APPARATUS AND INPUT ACQUIRING METHOD

(71) Applicant: TOYOTA JIDOSHA KABUSHIKI KAISHA, Toyota-shi, Aichi (JP)

(72) Inventors: Chihiro Sannomiya, Minato-ku (JP); Hiroki Okada, Toyota (JP); Junko Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 14/758,029

(22) PCT Filed: Jan. 21, 2014

(86) PCT No.: PCT/JP2014/000275
§ 371 (c)(1),
(2) Date: Jun. 26, 2015

(87) PCT Pub. No.: WO2014/112397
PCT Pub. Date: Jul. 24, 2014

(65) Prior Publication Data
US 2015/0360567 A1 Dec. 17, 2015

(30) Foreign Application Priority Data
Jan. 21, 2013 (JP) ................................ 2013-008385

(51) Int. Cl.
*G06F 3/045* (2006.01)
*B60K 35/00* (2006.01)
(Continued)

(52) U.S. Cl.
CPC .............. *B60K 35/00* (2013.01); *G06F 3/044* (2013.01); *G06F 3/0414* (2013.01);
(Continued)

(58) Field of Classification Search
CPC .... G06F 3/04883; G06F 3/044; G06F 3/0414; B60K 35/00; B60K 2350/928; B60K 2350/1008
See application file for complete search history.

(56) References Cited

U.S. PATENT DOCUMENTS

2012/0179328 A1* 7/2012 Goldman-Shenhar . B62D 1/046
701/36
2013/0141372 A1* 6/2013 Kang ..................... G06F 3/041
345/173

FOREIGN PATENT DOCUMENTS

CN 102582673 A 7/2012
JP H10-269012 A 10/1998
(Continued)

*Primary Examiner* — Towfiq Elahi
(74) *Attorney, Agent, or Firm* — Oliff PLC

(57) ABSTRACT

A user interface apparatus made of a grip portion which is gripped by an operator; a contact sensor which is arranged on a surface of the grip portion and which detects a contact position; a sensor information acquiring unit configured to acquire sensor information outputted from the contact sensor; and an input operation acquiring unit configured to acquire a difference between pieces of sensor information respectively acquired at different times and to determine that an input operation corresponding to a predetermined pattern has been performed when the difference conforms to the predetermined pattern.

12 Claims, 17 Drawing Sheets

(51) Int. Cl.
*G06F 3/0488* (2013.01)
*G06F 3/041* (2006.01)
*G06F 3/044* (2006.01)

(52) U.S. Cl.
CPC .. *G06F 3/04883* (2013.01); *B60K 2350/1008* (2013.01); *B60K 2350/928* (2013.01)

(56) References Cited

FOREIGN PATENT DOCUMENTS

| | | | |
|---|---|---|---|
| JP | 2000228126 | A | 8/2000 |
| JP | 2005326961 | A | 11/2005 |
| JP | 2008087566 | A | 4/2008 |
| JP | 2009129171 | A | 6/2009 |
| JP | 2009248629 | A | 10/2009 |
| JP | 2012164272 | A | 8/2012 |
| JP | 2012168595 | A | 9/2012 |

* cited by examiner

| OPERATION PATTERN | |
|---|---|
| OPERATION | PATTERN |
| SELECT | THERE IS REGION TAPPED TWICE WITHIN 500 ms AT SAME LOCATION |
| CANCEL | THERE IS REGION TAPPED THREE TIMES WITHIN 1000 ms AT SAME LOCATION |
| MOVED UP | THERE IS REGION MOVED UPWARD BY 30 POINTS OR MORE |
| MOVED DOWN | THERE IS REGION MOVED DOWNWARD BY 30 POINTS OR MORE |
| MOVED RIGHT | THERE IS REGION MOVED RIGHTWARD BY 30 POINTS OR MORE |
| MOVED LEFT | THERE IS REGION MOVED LEFTWARD BY 30 POINTS OR MORE |
| ... | ... |

FIG. 6

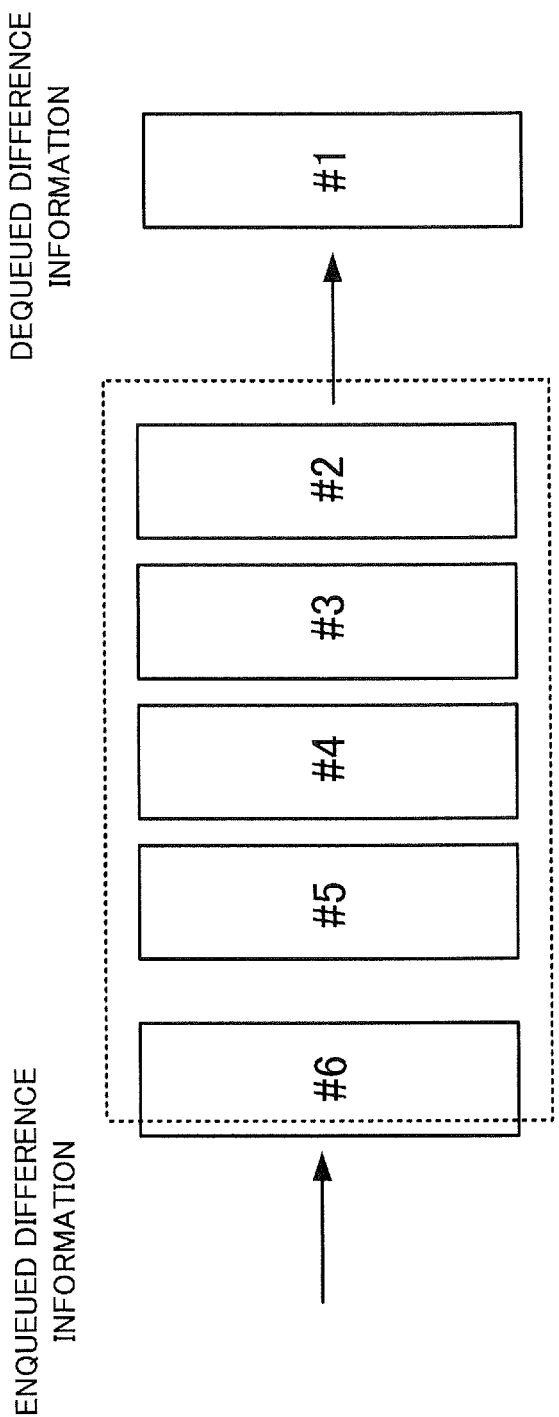

("N" MEANS "NO VARIATION")

FIG. 16

| TYPE | PATTERN |
|---|---|
| START GESTURE | THERE IS REGION TAPPED TWICE WITHIN 500 ms AT SAME LOCATION |
| END GESTURE | THERE IS REGION TAPPED THREE TIMES WITHIN 1000 ms AT SAME LOCATION |

USER INTERFACE APPARATUS AND INPUT ACQUIRING METHOD

TECHNICAL FIELD

The present invention relates to a user interface apparatus for manual input operations.

BACKGROUND ART

Various apparatuses that enable an occupant of a vehicle to perform an input operation with respect to a vehicle-mounted device have been proposed.

Since touch panel displays that are currently popular as input apparatuses are mainly arranged on a center console between a driver's seat and a passenger's seat, performing an operation requires moving a hand over a considerable distance. In other words, there is plenty of room for improvement with respect to a workload placed on a driver when performing an input operation.

Examples of apparatuses which enable a driver to perform an input operation with a smaller workload includes an apparatus described in Patent Literature 1. The apparatus described in Patent Literature 1 has a touch pad built into a spoke portion of a steering wheel, and by performing an operation on the touch pad, a driver can perform an input with respect to a vehicle-mounted apparatus.

However, even when using this apparatus, a driver must move a hand in order to operate the touch pad. In addition, there is a problem that a position or an orientation of the touch pad changes depending on a rotational state of the steering wheel and, as a result, operability declines.

In consideration of such problems, a proposal for building a sensor into a grip portion of a steering wheel itself has been made. An input apparatus described in Patent Literature 2 has a touch sensor built into an entire circumference of a steering wheel, and by performing an operation involving moving a hand on the steering wheel, a driver can perform an input with respect to a vehicle-mounted device. The input device has a switch for determining whether or not an input operation is being performed and only accepts an input operation when the switch is activated.

CITATION LIST

Patent Literature

[PTL 1]
Japanese Patent Application Laid-open No. 2009-129171
[PTL 2]
Japanese Patent Application Laid-open No. 2009-248629

SUMMARY OF INVENTION

By providing a sensor in a grip portion of a steering wheel, a driver can perform an input operation without releasing the steering wheel. However, since the driver is constantly gripping the steering wheel during driving, simply providing a sensor in the grip portion is insufficient for determining whether the driver is performing an input operation or simply gripping the steering wheel.

While the invention described in Patent Literature 2 enables the determination described above to be performed by providing a switch for switching between enabling and disabling an input operation, this method requires that the switch be operated every time an input operation is started and finished. Therefore, the original problem of reducing the workload on the driver cannot be solved.

In order to reduce the workload on the driver, input operations must be appropriately determined based solely on information acquired by a sensor without forcing the driver to perform special operations.

The present invention has been made in consideration of the problems described above and an object thereof is to provide a user interface apparatus that enables input operations to be performed with a low workload.

The present invention in its one aspect provides a user interface apparatus, comprising a grip portion which is gripped by an operator; a contact sensor which is arranged on a surface of the grip portion and which detects a contact position; a sensor information acquiring unit configured to acquire sensor information outputted from the contact sensor; and an input operation acquiring unit configured to acquire a difference between pieces of sensor information respectively acquired at different times and to determine that an input operation corresponding to a predetermined pattern has been performed when the difference conforms to the predetermined pattern.

A grip portion is a portion that is gripped by an operator and is typically a steering wheel of a vehicle.

A contact sensor is arranged on a surface of the grip portion. A contact sensor is a sensor capable of detecting a contact position of the fingers of the operator and is typically a flat-plate sensor such as that used in a touch pad. The contact sensor may be arranged anywhere as long as contact positions of the fingers of the operator gripping the grip portion can be detected. For example, when the grip portion is a steering wheel, the contact sensor may cover the entire wheel or may cover only a part of the wheel. Alternatively, the contact sensor may be arranged only on a surface facing the driver.

In addition, a sensor information acquiring unit is a unit for collecting sensor information outputted from the contact sensor, and input operation acquiring unit is a unit for acquiring an input operation performed by the operator based on collected sensor information. Specifically, a difference between pieces of sensor information respectively acquired at a plurality of times is acquired and a determination is made on whether or not the difference conforms to a predetermined pattern. Accordingly, even in a state where a part of the hand or a finger of the operator is always in contact with the contact sensor, a movement of a finger can be detected and a content of an input operation can be acquired.

In addition, the predetermined pattern may represent a temporal change of the number of regions or position of a region in which the contact sensor detects contact.

Specifically, a predetermined pattern refers to a pattern indicating that any of the number of regions or a position of a region in which contact is being detected by the contact sensor has varied over time. Accordingly, an operation involving tapping a finger or an operation involving moving a finger (such as dragging, flicking, or swiping) performed on the contact sensor can be detected.

In addition, the user interface apparatus according to present invention may further comprises a gripping pattern storage unit configured to store a gripping pattern different from the predetermined pattern, and the input operation acquiring unit may extract a region that does not conform to the gripping pattern for each piece of sensor information acquired at a different time, acquires a difference between a plurality of the extracted regions, and collate the difference with the predetermined pattern.

A gripping pattern refers to static information representing a normal gripped state in which an input operation is not performed by the operator. Among regions represented by sensor information, a region conforming to a gripping pattern is assumed to be a region that is not related to an input operation. Therefore, by extracting only a region not conforming to a gripping pattern from sensor information and using the region for determination, a detection accuracy of an input operation can be improved.

In addition, the input operation acquiring unit may extract a region that corresponds to a specific finger of the operator for each piece of sensor information acquired at a different time, acquires a difference between a plurality of the extracted regions, and collate the difference with the predetermined pattern.

When a finger used by the operator to perform input operations is decided, only regions corresponding to the finger may be extracted. For example, when the apparatus is a steering wheel, it is assumed that input operations are to be performed by the thumb. Therefore, only a region corresponding to the thumb is extracted from sensor information and used to make determinations. Accordingly, an influence of fingers not used for input can be eliminated and a detection accuracy of input operations can be improved.

In addition, the input operation acquiring unit may determine that an input operation is not performed when a variation in a total area of a region, in which the contact sensor detects contact, within a unit time is outside a predetermined range.

As described earlier, the user interface apparatus according to the present invention detects a movement of a finger on the contact sensor by acquiring a difference between pieces of sensor information. However, with this method, there is a risk of erroneously detecting operations unrelated to input such as the operator regripping the apparatus or slightly changing positions of the fingers. In consideration thereof, when a variation of a total area of a region in which contact is detected in a unit time is greater or smaller than a predetermined value, it is assumed that the variation is not attributable to an input operation and an acquisition of an input operation during the unit time is not performed. Accordingly, hand movements that are unrelated to input operations can be eliminated.

In addition, the input operation acquiring unit may determine that an input operation is not performed when an increase in the number of regions, in which the contact sensor detects contact, within the unit time is greater than a predetermined number.

When an output of the contact sensor cannot be obtained in the form of area, a similar determination may be made according to the number of regions in which contact is detected. For example, in a case where an increase in the number of regions per unit time is excessive, it is conceivable that the operator has regripped the apparatus itself. Therefore, such a case is favorably eliminated. Whether a determination is to be made based on an area or on the number may be selected depending on types of contact sensors.

In addition, the predetermined pattern may comprise a start pattern and a main pattern, and the input operation acquiring unit may collate the difference between pieces of sensor information with the start pattern, and collates the difference with the main pattern in a subsequent predetermined period after the difference has been determined to conform to the start pattern.

A main pattern is a pattern representing an input operation itself, and a start pattern is a pattern representing an operation for declaring a start of an input operation. Favorably, an operation for declaring a start of an input operation is an operation not included in a normal operation such as long pressing, consecutive tapping, and drawing of a predetermined graphic. By starting collation with a main pattern only when a start pattern is detected, an erroneous detection of an input operation can be prevented. Moreover, a predetermined period may be an arbitrary period or a period until an input operation is completed.

In addition, the user interface apparatus according to present invention may further comprise a signal transmitting unit configured to store an external signal that is a signal to be transmitted to an external device and transmit an external signal corresponding to an input operation acquired by the input operation acquiring unit to the external device.

An acquired input operation may be transformed into a signal for an external device and transmitted to the device. Accordingly, an acquired input operation can be transmitted to an arbitrary device.

In addition, the gripping portion may be a steering wheel of a vehicle.

Since the present invention enables different input operations to be performed without removing one's hand from the grip portion, the present invention is particularly suitable for apparatuses for steering a vehicle.

In addition, the user interface apparatus according to present invention may further comprise a steering state acquiring unit configured to acquire a rotational angle of the gripping portion, and the input operation may be an operation for specifying a direction, and the input operation acquiring unit may correct a direction of a determined input operation based on the rotational angle of the grip portion acquired by the steering state acquiring unit and a detection result of the contact sensor.

Since a steering wheel is circular, a direction of an input operation changes depending on a rotational angle or a position of the hand of an operator. For example, when a wheel is turned to the left by 90 degrees in a state where a right side of the wheel is being gripped, an operation representing leftward swiping prior to the rotation becomes an operation representing downward swiping after the rotation. In consideration thereof, a direction of an input operation may be corrected based on a rotational angle of the steering wheel and on sensor information. Accordingly, regardless of a rotational angle of the steering wheel or a position of the hand, a same direction can always be inputted.

In addition, the user interface apparatus according to present invention may further comprise a display unit configured to present a correction state of an input operation to an operator.

In a case where an operation direction is being presented to the operator via a screen display, when the direction of an input operation is corrected, the screen display and an actual operation direction no longer conform to each other. For example, when a screen informing that a telephone application is to be activated is displayed by a leftward swipe operation, since a leftward swipe operation is corrected to a downward swipe operation by rotating the steering wheel leftward by 90 degrees, the operation direction no longer conforms to the screen display. In this case, by rotating a display representing an operation direction leftward by 90 degrees, the display and the process can be conformed to one another. In this manner, by presenting the operator with a correction state of a direction of an input operation, the operator can intuitively learn in which direction the fingers are to be moved.

Moreover, the present invention may be specified as a user interface apparatus which includes at least a part of means described above. In addition, the present invention may be specified as an input acquiring method which includes at least a part of the processes described above. The processes and the means described above can be freely combined and implemented as long as no technical contradictions arise.

According to the present invention, an user interface apparatus that enables input operations to be performed with a low workload can be provided.

Further features of the present invention will become apparent from the following description of exemplary embodiments with reference to the attached drawings.

BRIEF DESCRIPTION OF DRAWINGS

FIG. 6 is a diagram showing an example of an operation pattern according to the first embodiment;

FIG. 8 is a diagram for explaining queuing of sensor information;

FIG. 16 is a diagram for explaining a start pattern according to the fourth embodiment.

DESCRIPTION OF EMBODIMENTS

First Embodiment

<System Configuration>

A vehicular input apparatus according to a first embodiment is an apparatus which acquires a content of an operation inputted by a driver and which outputs a signal corresponding to the operation to an external vehicle-mounted terminal. The vehicular input apparatus according to the first embodiment comprises a steering wheel 10 and a controller 20. Hereinafter, a system configuration will be described with reference to FIGS. 1 to 3.

Figure 1:
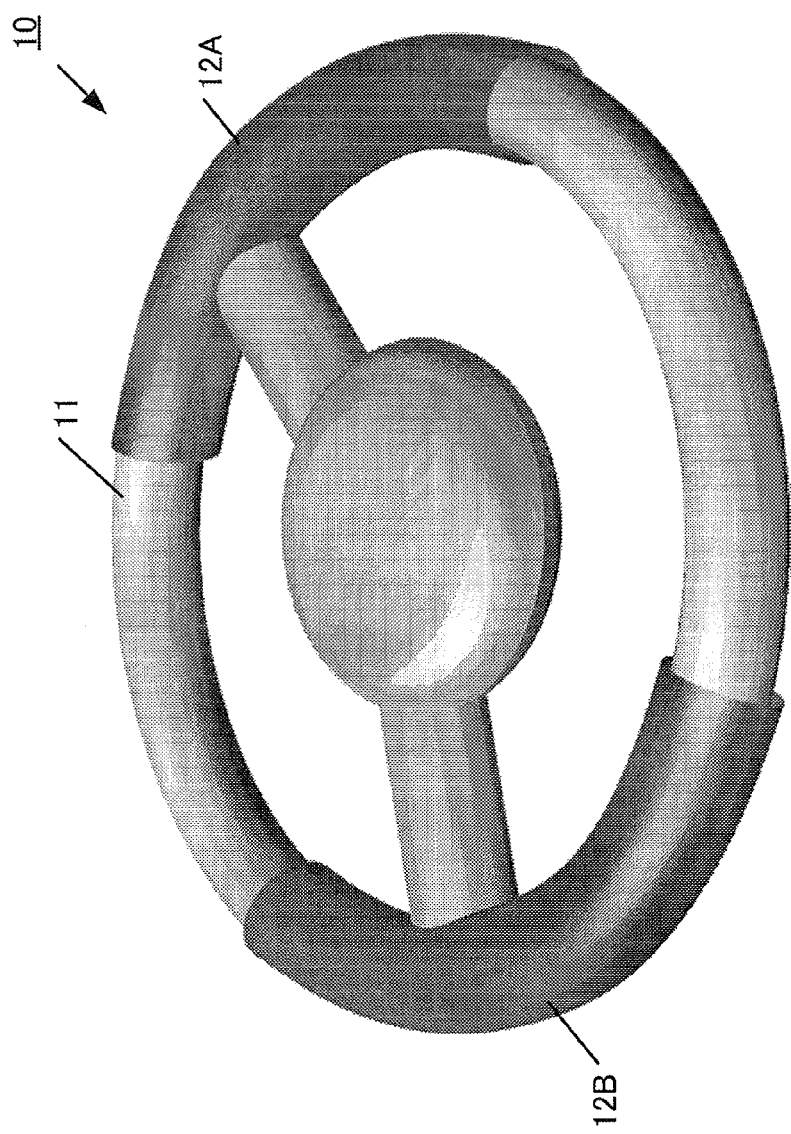
FIG. 1 is an external view of a steering wheel according to a first embodiment.

FIG. 1 is a diagram showing a physical configuration of the steering wheel 10.

Reference sign 11 denotes a portion which is gripped by both hands of a driver in a normal driving operation (a grip portion according to the present invention) and is a circular wheel.

Reference signs 12A and 12B denote a contact sensor arranged on a surface of the grip portion. The contact sensor covers the steering wheel by being wounded around the grip portion and is arranged divided into two portions, namely, a portion (12A) with which the right hand comes into contact and a portion (12B) with which the left hand comes into contact.

As long as positions where fingers of the driver are in contact with the grip portion can be detected, the contact sensor 12A and 12B may be any kind of sensor. For example, an electrostatic sensor that detects a change in electrostatic capacitance or a pressure sensor may be used. In the present embodiment, the contact sensor is a sensor capable of outputting positions and shapes of a plurality of regions in which contact is detected on a plane. The contact sensor need only be a sensor capable of simultaneously detecting contact at a plurality of locations. For example, a single sensor capable of detecting contact at a plurality of locations or a group of sensors respectively capable of detecting contact at a single location may be used.

Moreover, hereinafter, the contact sensor 12A arranged in a right hand portion and the contact sensor 12B arranged in a left hand portion will be collectively referred to as a contact sensor 12. In addition, while only an example in which movements of the right hand are detected will be considered in the description of the embodiment, a similar process for detecting movement of the left hand may be performed in parallel. Furthermore, pieces of information respectively outputted from the contact sensors 12A and 12B may be combined and processing may be performed by considering the contact sensors 12A and 12B to be a single virtual sensor.

Figure 2:
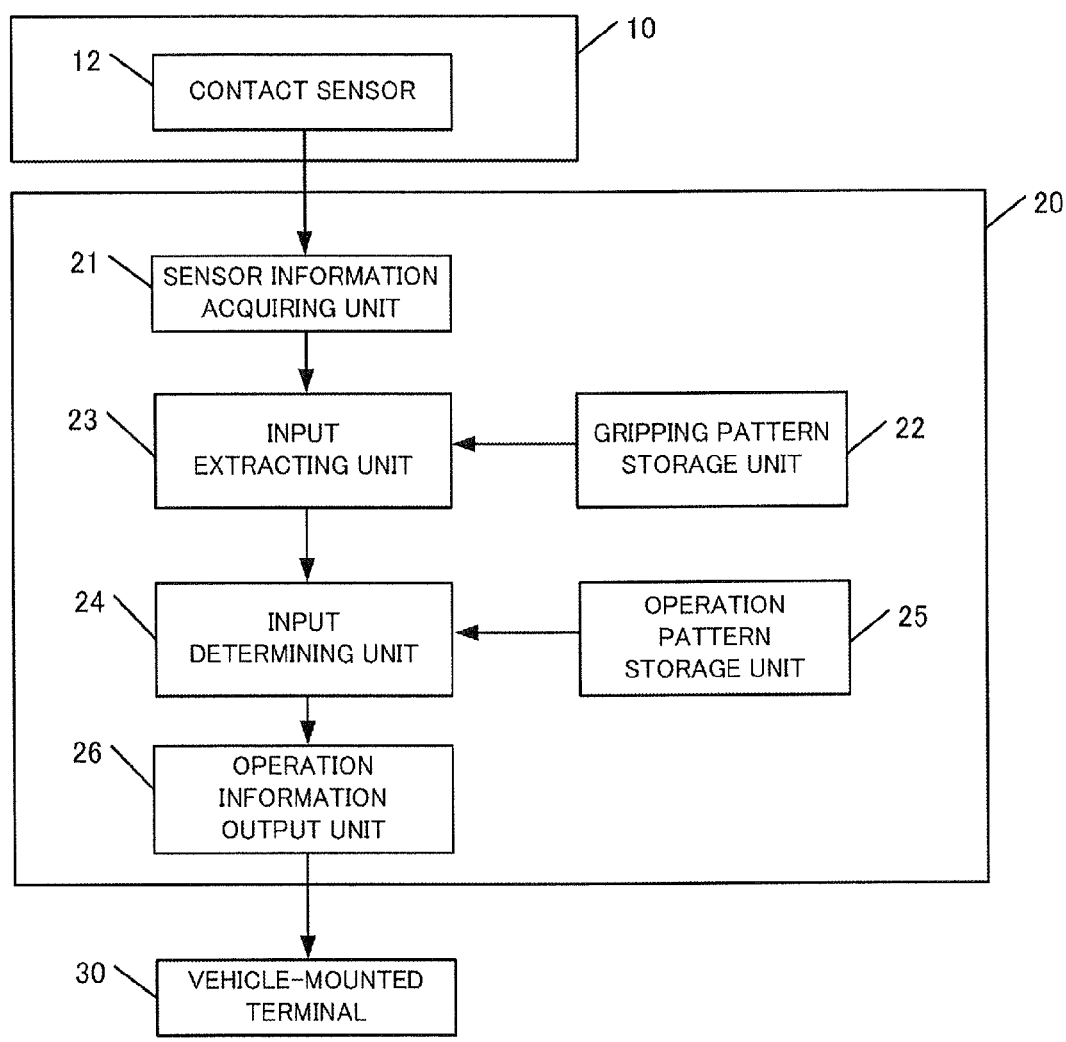
FIG. 2 is a system configuration diagram of a controller according to the first embodiment.

The controller 20 is an apparatus which acquires information from the contact sensor 12 arranged on the steering wheel 10 and, after determining whether or not an input operation by a driver is being performed, outputs a signal corresponding to the acquired input operation to a vehicle-mounted terminal 30. FIG. 2 is a system configuration diagram of the controller 20.

The controller 20 may be realized by exclusively designed hardware or by a computer including a CPU, a main storage device, and an auxiliary storage device. When the controller 20 is realized by a computer, a program stored in the auxiliary storage device is loaded onto the main storage device and executed by the CPU, in which case the respective means shown in FIG. 2 are activated (the CPU, the main storage device, and the auxiliary storage device are not shown). Hereinafter, respective means constituting the controller 20 will be described.

A sensor information acquiring unit 21 is a unit for receiving information transmitted by the contact sensor 12 and corresponds to a sensor information acquiring unit according to the present invention. The sensor information acquiring unit 21 generates a bit map representing a detection result of the contact sensor based on information received from the contact sensor 12. The bit map will be referred to as sensor information.

Figure 3:
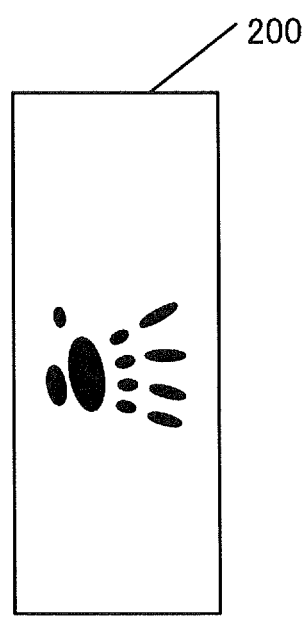
FIG. 3 is a diagram showing an example of sensor information outputted from a contact sensor.

FIG. 3 shows an example of sensor information generated by the sensor information acquiring unit 21. A rectangular bit map 200 corresponds to an expansion of the contact sensor 12A wound around the grip portion. In the example shown in FIG. 3, regions in which the contact sensor detects contact are painted in black. Hereinafter, a region in which the contact sensor detects contact will be referred to as a contact region.

A gripping pattern storage unit 22 is a unit for storing a pattern in which the driver grips the steering wheel during normal driving (hereinafter, a gripping pattern). A gripping pattern is a static contact pattern in a case where the driver grips the steering wheel and is, for example, stored in a bit map format such as that shown in FIG. 4. Since positions where the driver grips the steering wheel are not constant, potential positions of the hands on the wheel are not stored. The gripping pattern storage unit 22 corresponds to a gripping pattern storage unit according to the present invention.

An input extracting unit 23 is a unit for collating sensor information acquired from the contact sensor 12 with a gripping pattern stored in the gripping pattern storage unit 22 and extracting only a region that does not conform to the pattern.

Figure 4:
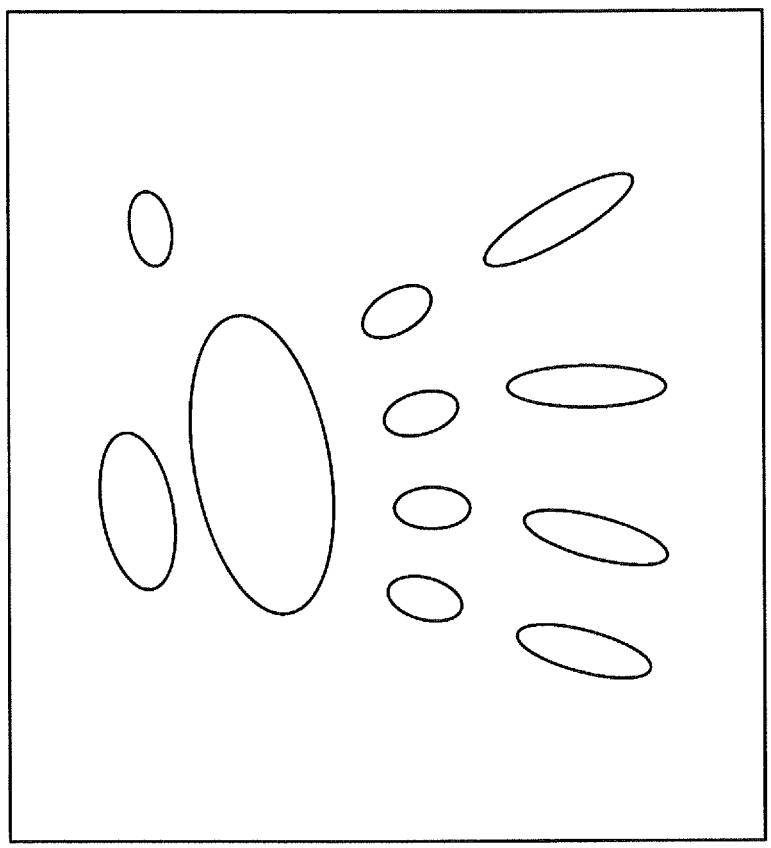
FIG. 4 is an example of a gripping pattern according to the first embodiment.

For example, a case will be considered where a state of the right hand gripping the steering wheel is stored as a gripping pattern as shown in FIG. 4. The input extracting unit 23 aligns the sensor information and the gripping pattern and acquires a difference between the sensor information and the gripping pattern at the aligned position. If the driver is gripping the steering wheel by a same gripping style as in the gripping pattern, since the sensor information and the gripping pattern conform to one another, the input extracting unit 23 does not output anything. However, if any of the fingers is moved, since a region that does not conform to the gripping pattern is created, information on the region is extracted and outputted.

Figure 5:
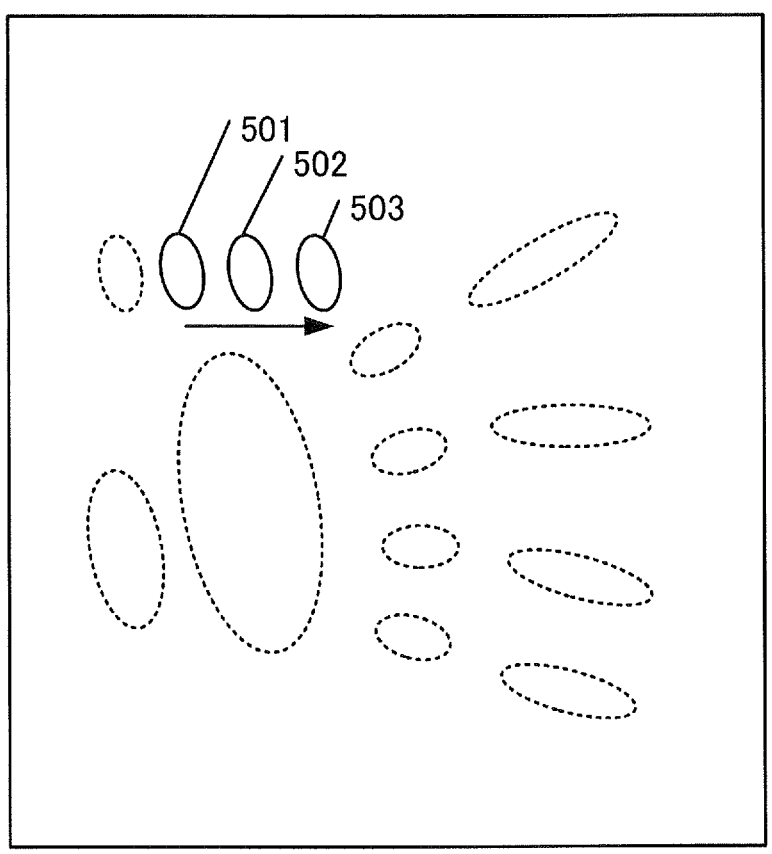
FIG. 5 is a diagram showing an example of detecting movements of fingers from a plurality of pieces of sensor information.

A specific example will now be shown. FIG. 5 is a diagram showing sensor information outputted when the thumb is moved rightward over time. Dotted lines depict regions that conform to the gripping pattern and are therefore filtered, and solid lines depict regions extracted by the input extracting unit 23. Although nothing is extracted at time t, a region 501 is extracted at time t+1, a region 502 is extracted at time t+2, and a region 503 is extracted at time t+3. The extracted regions are respectively transmitted to an input determining unit 24 in bit map format.

The input determining unit 24 is a unit which acquires a change in sensor information over time and determines what kind of input operation had been performed by the driver. Specifically, a difference among a plurality of bit maps acquired from the input extracting unit 23 is acquired and a determination is made on whether or not the difference conforms to a stored operation pattern. Accordingly, for example, a determination such as "a rightward swipe operation was performed" and "a double tap operation was performed" can be made.

An operation pattern storage unit 25 is a unit for storing a pattern (an operation pattern) for determining an input operation performed by the driver. For example, when operation patterns are defined as shown in FIG. 6 and a region that has moved rightward by 30 points or more is detected, a determination can be made that a rightward swipe operation has been performed.

Moreover, while operation patterns are exemplified in this case by sentences, an operation pattern need only be information representing a temporal change of a contact region and may be stored in other formats as long as the operation pattern can be collated with a difference acquired from sensor information.

The input extracting unit 23, the input determining unit 24, and the operation pattern storage unit 25 correspond to an input operation acquiring unit according to the present invention.

An operation information output unit 26 is a unit for transforming a content of an operation input determined by the input determining unit 24 into a signal that can be interpreted by the vehicle-mounted terminal 30. For example, when the operation input determined by the input determining unit 24 is leftward swiping, a signal that causes a cursor to move leftward is generated and transmitted. In addition, when the operation input determined by the input determining unit 24 is double tapping, a signal signifying input finalization is generated and transmitted. The operation information output unit 26 corresponds to a signal transmitting unit according to the present invention.

The vehicle-mounted terminal 30 is a terminal that is an operation object and is typically a smart phone, a tablet computer, a car navigation system, a vehicle-mounted AV system, or the like. In addition, the vehicle-mounted terminal 30 includes display means (not shown) and is capable of presenting a screen to the driver. For example, the screen may be displayed on a head-up display provided at the driver's seat or may be projected on the windshield. While the screen may be displayed on a liquid crystal display or the like, the device is favorably visible to the driver without moving his or her line of sight.

<Processing Flow Chart>

Figure 7:
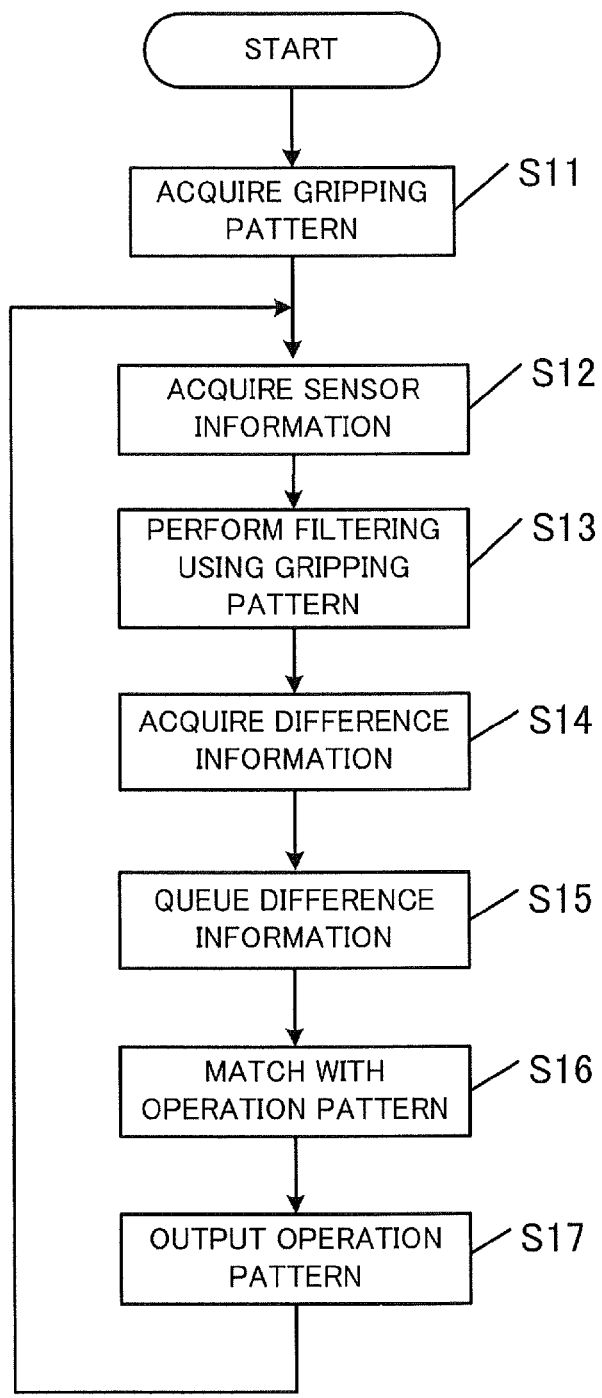
FIG. 7 is a processing flow chart of a controller according to the first embodiment.

Next, an input operation acquiring process performed by the vehicular input apparatus according to the first embodiment will be described in detail with reference to FIG. 7. The process shown in FIG. 7 is periodically executed.

First, in step S11, the input extracting unit 23 acquires a gripping pattern from the gripping pattern storage unit 22 and temporarily stores the gripping pattern. In this case, it is assumed that a gripping pattern corresponding to the right hand is stored in a bit map format such as that shown in FIG. 4.

In step S12, the sensor information acquiring unit 21 receives information from the contact sensor 12 and generates sensor information. At this point, if a predetermined period of time has not lapsed from a previous processing of step S12, a waiting time is inserted until the predetermined period of time is reached. The predetermined period of time can be set to, for example, 50 milliseconds. The generated sensor information is transmitted to the input extracting unit 23.

In step S13, the input extracting unit 23 subjects a bit map representing the sensor information and a bit map representing the gripping pattern to pattern matching and aligns the bit maps. Specifically, similarities are calculated while shifting positions of both bit maps and a position with a highest similarity is determined. Subsequently, a difference between both bit maps at the determined position is acquired. As a result, only a region that does not conform to the gripping pattern is extracted from the bit map representing sensor information. The obtained region is referred to as a varied region. When the similarity according to pattern matching does not reach a predetermined value, filtering by a gripping pattern is omitted and a transition is made to the process of step S14. Information regarding the varied region is transmitted to the input determining unit 24.

In step S14, the input determining unit 24 acquires a difference between the varied region acquired in step S13 and a varied region of a generation ago (in other words, a varied region acquired in a previous process) and acquires information representing how the varied region had changed. The information represents an appearance or disappearance, an amount of movement, a direction of movement, or the like of a region and will be referred to as difference information. When the varied region of a generation ago is not stored, the acquired varied region is temporarily stored, steps S14 and thereafter are skipped, and processes of a next cycle are executed.

For example, when varied regions acquired by the input determining unit 24 are denoted by reference signs 501 and 502 in FIG. 5, information describing that the varied region has "moved rightward by n points" is acquired as difference information. The difference information may be obtained by subjecting varied regions to pattern matching or by other methods. Moreover, when there is no difference, difference information representing "no variation" may be generated. In addition, when a change in the varied region cannot be identified, difference information representing "undeterminable" may be generated.

Step S15 is a step in which the input determining unit 24 queues difference information. Queuing will now be described. While input operations performed by the driver are continuous operations such as flicking or swiping, there are operations such as double tapping that cannot be determined solely by a single piece of difference information. In consideration thereof, by accumulating difference information in a queue, a determination is made as to whether an overall meaningful operation has been performed.

FIG. 8 is a diagram for explaining a queue in which difference information is stored. Each rectangle represents a piece of difference information, and a leftmost rectangle represents apiece of difference information added to the queue while a rightmost rectangle represents apiece of difference information deleted from the queue. In this case, it is assumed that a total of five pieces of information are held in the queue. In other words, pieces of difference information are accumulated in an order of arrival, and when a sixth piece of difference information arrives, an oldest piece of difference information is deleted.

Step S16 is a step in which the input determining unit 24 determines whether or not the pieces of difference information accumulated in the queue conform to an operation pattern (in other words, whether or not the pieces of difference information accumulated in a queue represent a specific input operation).

FIG. 9 is a diagram showing a specific example of queued difference information. Reference sign 901 denotes a situation in which a contact region has been newly detected. In addition, reference sign 902 denotes a situation in which a contact region has moved downward by 30 points. Furthermore, reference sign 903 denotes a situation in which a detected contact region has disappeared. Moreover, acquisition intervals of the pieces of difference information are set to, for example, 100 milliseconds.

Figure 9A:
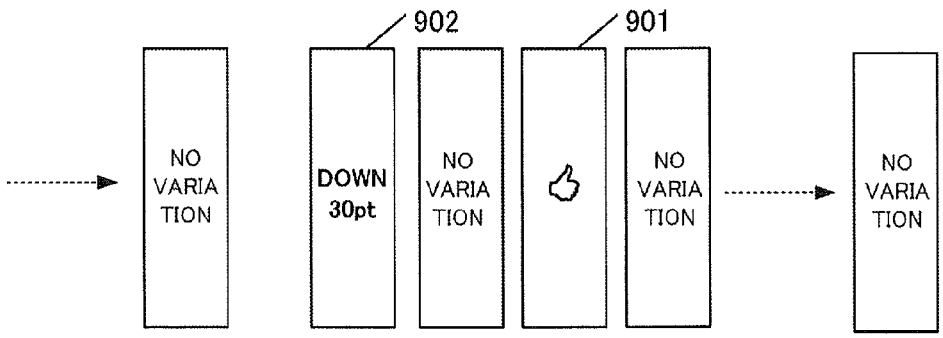
FIG. 9A to 9C are another diagrams for explaining queuing of sensor information.
Figure 9B:
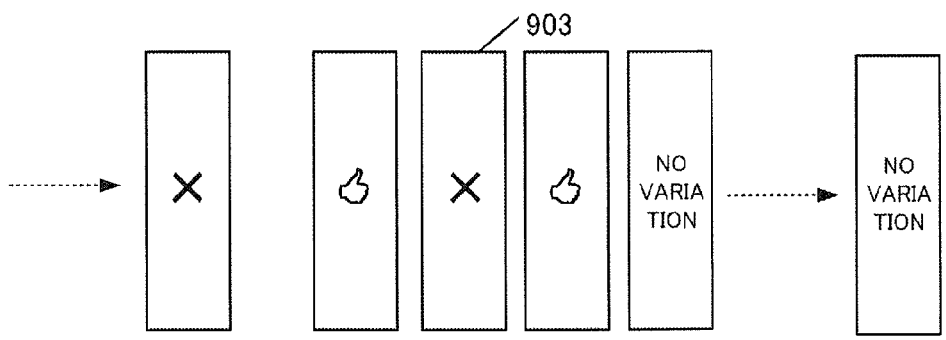
Figure 9C:
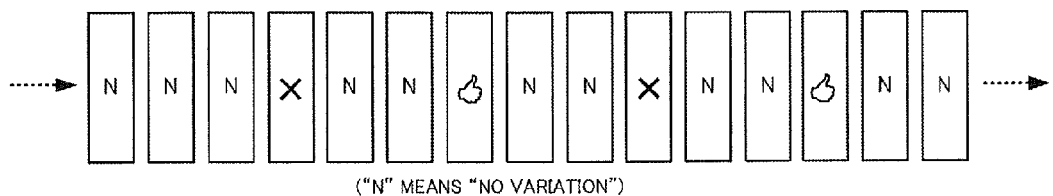

For example, in FIG. 9A, after coming into contact with a sensor, a finger of the driver has moved downward by 30 points. Collating FIG. 9A with the operation pattern shown in FIG. 6 results in a conformance to data representing a downward swipe operation. In addition, FIG. 9B shows that a movement in which the finger of the driver comes into contact with the sensor and subsequently detaches from the sensor had occurred twice 200 milliseconds apart. In other words, FIG. 9B conforms to data representing a double tap operation.

Moreover, while a description using five pieces of difference information has been given in the present example for the sake of simplicity, if an input operation can be determined by referencing the entire queue, an input operation may be determined using a greater number of pieces of difference information. For example, when the acquisition intervals are 30 milliseconds and there are 15 pieces of difference information to be queued, FIG. 9C conforms to data representing a double tap operation.

In step S16, the input determining unit 24 collates the operation pattern stored in the operation pattern storage unit 25 with the difference information accumulated in the queue. At this point, when a corresponding operation pattern is included in the queue, the operation information output unit 26 outputs a signal corresponding to the operation pattern to the vehicle-mounted terminal 30 (step S17), and after clearing the queue, returns to step S12. When there is no corresponding operation pattern, output is not performed and a return is made to step S12.

Figure 10:
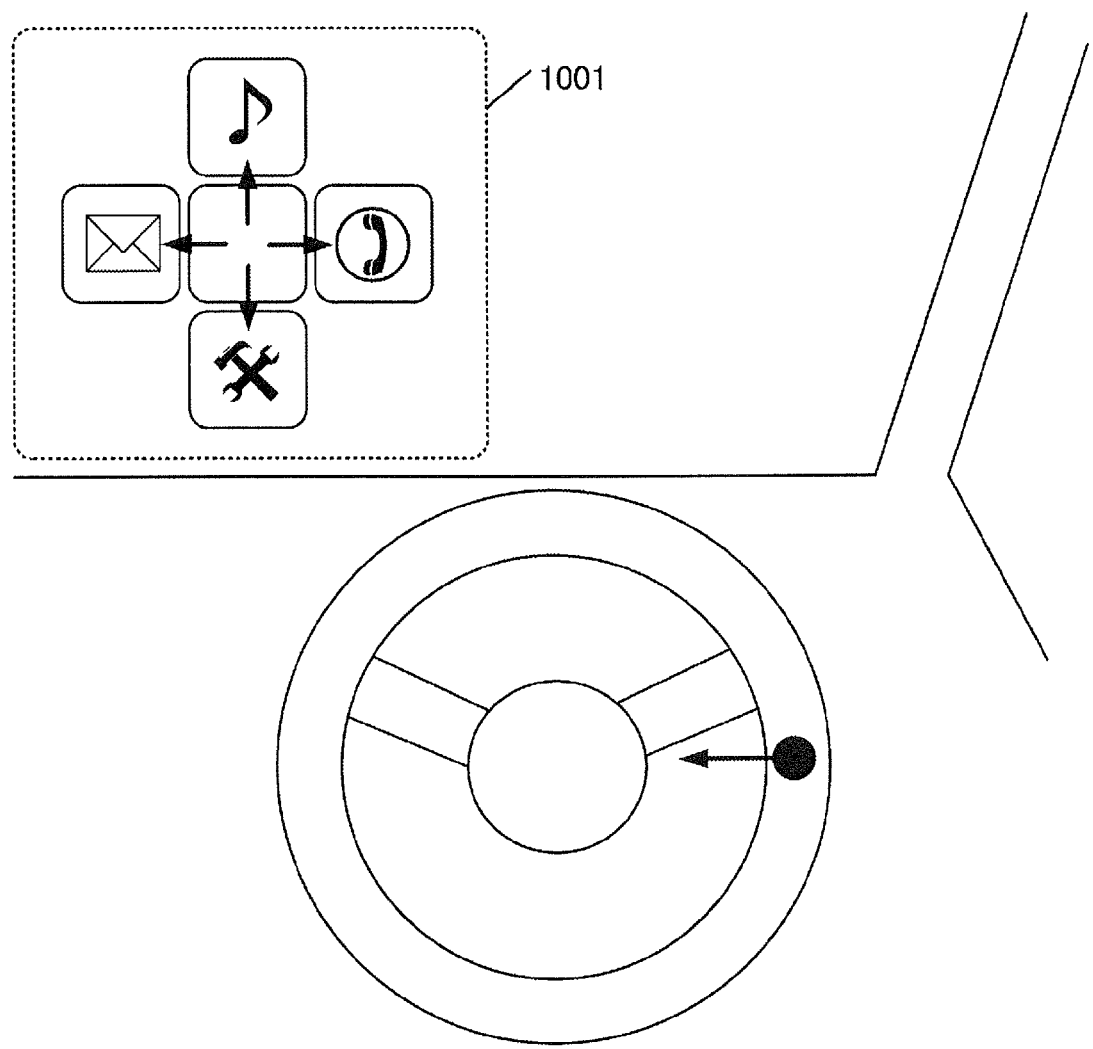
FIG. 10 is a diagram showing a relationship between an input operation and a screen outputted by a vehicle-mounted terminal.

According to the first embodiment, a driver can perform an input operation to the vehicle-mounted terminal while maintaining a state where the driver is gripping the steering wheel. FIG. 10 is a diagram showing an example of an input operation. Reference sign 1001 denotes a screen projected on the windshield by display means (not shown) included in the vehicle-mounted terminal 30. In this case, it is assumed that instructing an upward, a downward, a leftward, or a rightward direction to the vehicle-mounted terminal 30 activates a corresponding application. For example, by performing an operation involving swiping a finger leftward driver while gripping the steering wheel, a mail application can be activated.

Modification of First Embodiment

Moreover, while a pattern in which a driver grips a steering wheel is stored in advance in the gripping pattern storage unit in the first embodiment, a gripping pattern may be acquired by learning or may be updated. For example, sensor information may be periodically detected and a region without a significant variation may be extracted and stored as a gripping pattern.

In addition, when there are a plurality of drivers, a gripping pattern corresponding to each driver may be stored and a gripping pattern corresponding to a person who is driving person may be used.

Furthermore, a plurality of gripping patterns with respect to a same driver may be stored. For example, the input extracting unit 23 may respectively align the sensor information and each gripping pattern and use the gripping pattern with a highest similarity in the process of step S13.

Alternatively, the input determining unit 24 may be configured to correct a direction of an acquired input operation.

Figure 11:
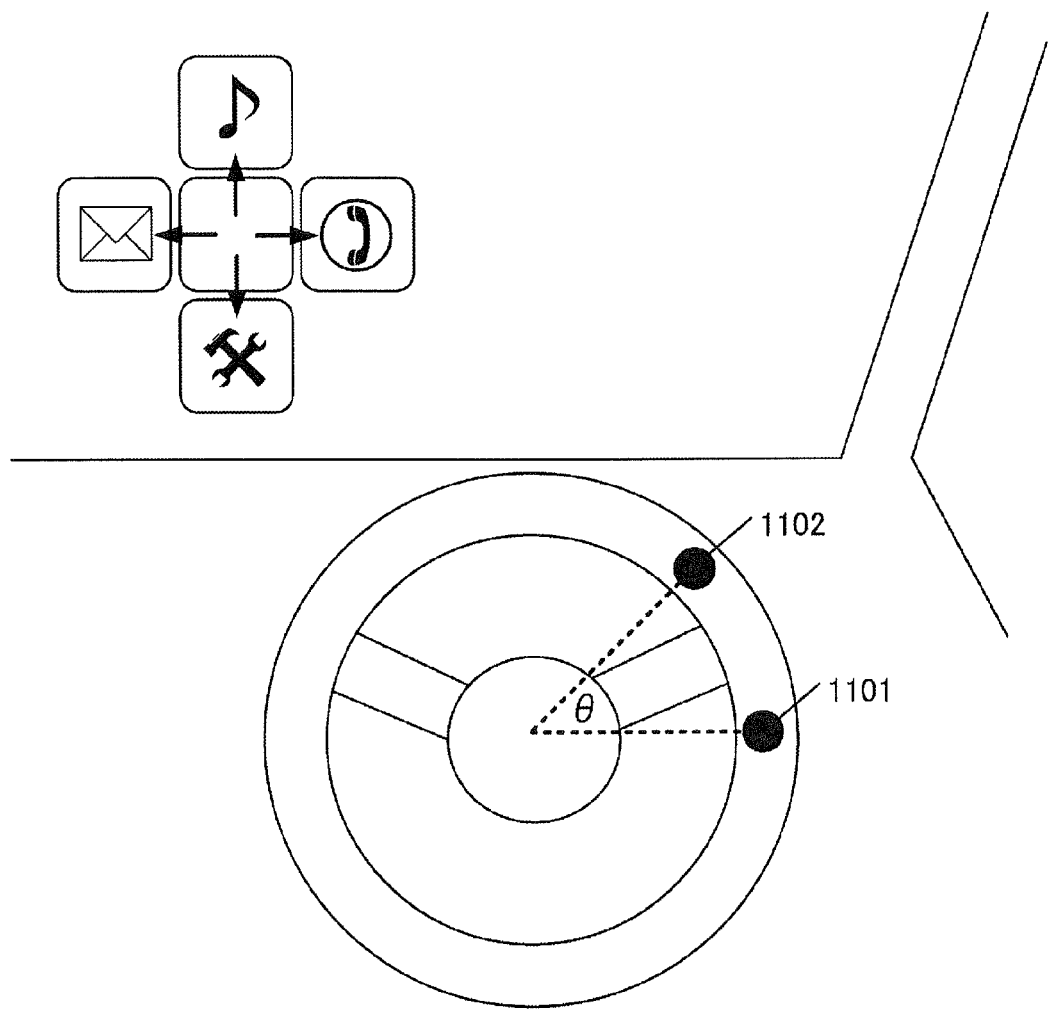
FIG. 11 is a diagram showing a method of correcting an input operation according to a modification of the first embodiment.

For example, in FIG. 11, with a case where a leftward swipe operation is performed at a position denoted by reference sign 1101 and a case where the same operation is performed in a state where the steering wheel is turned left by 90 degrees, the operations are both leftward swipe operations when the wrist is used as a reference. However, when a view point of the driver is used as a reference, operation directions differ as in the case of leftward swiping and downward swiping. In other words, operation directions differ between a case where the wrist is used as a reference and a case where a view point of the driver is used as a reference and may cause discomfort to the driver. This problem can be solved by providing unit for acquiring a rotational angle of the steering wheel (steering state acquiring unit (not shown)) and by adding an acquired rotational angle to an acquired operation direction. For example, when the input determining unit acquires a "leftward swipe operation" and the rotational angle is 90 degrees left, the determination result is corrected to a "downward swipe operation".

In the present embodiment, this is referred to as a first angle correction.

Such a problem similarly occurs due to positions of the hand of the driver in addition to the rotational angle of the steering wheel.

For example, in FIG. 11, with a case where a leftward swipe operation is performed at a position denoted by reference sign 1101 and a case where the same operation is performed at a position denoted by reference sign 1102, the operations are both leftward swipe operations when the wrist is used as a reference. However, when a view point of the driver is used as a reference, operation directions similarly differ as in the case of leftward swiping and left-downward swiping. This problem can be solved by adding an angle (θ) with respect to a horizontal direction of the position of the hand of the driver to the acquired operation direction.

In the present embodiment, this is referred to as a second angle correction.

Figure 12:
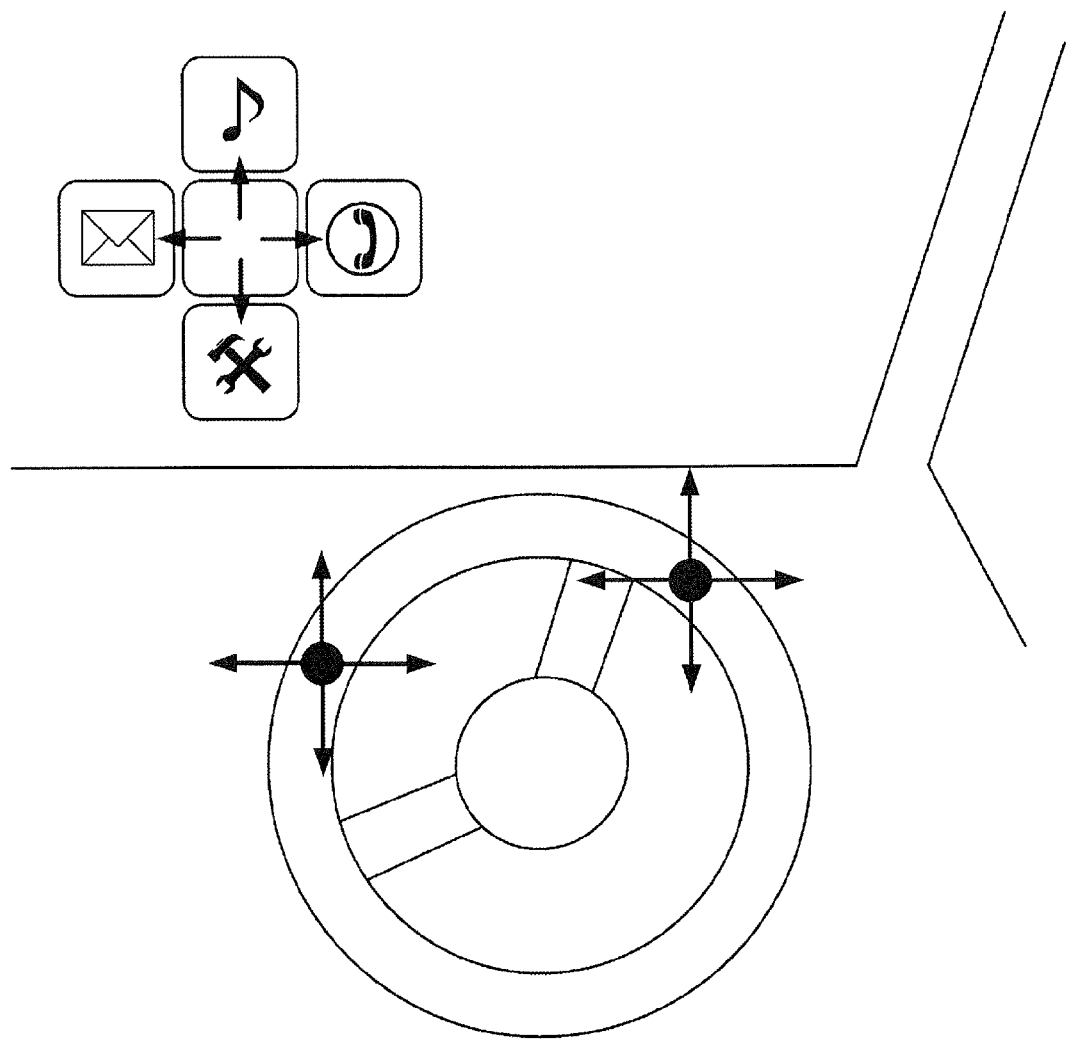
FIG. 12 is a second diagram showing a method of correcting an input operation according to the modification of the first embodiment.

By simultaneously executing the first angle correction and the second angle correction, as shown in FIG. 12 direction input based on the view point of the driver can be performed regardless of the rotational angle of the steering wheel and gripping position. However, since different drivers may have different preferences, favorably, a configuration is adopted in which whether or not to perform angle correction can be changed.

Figure 13:
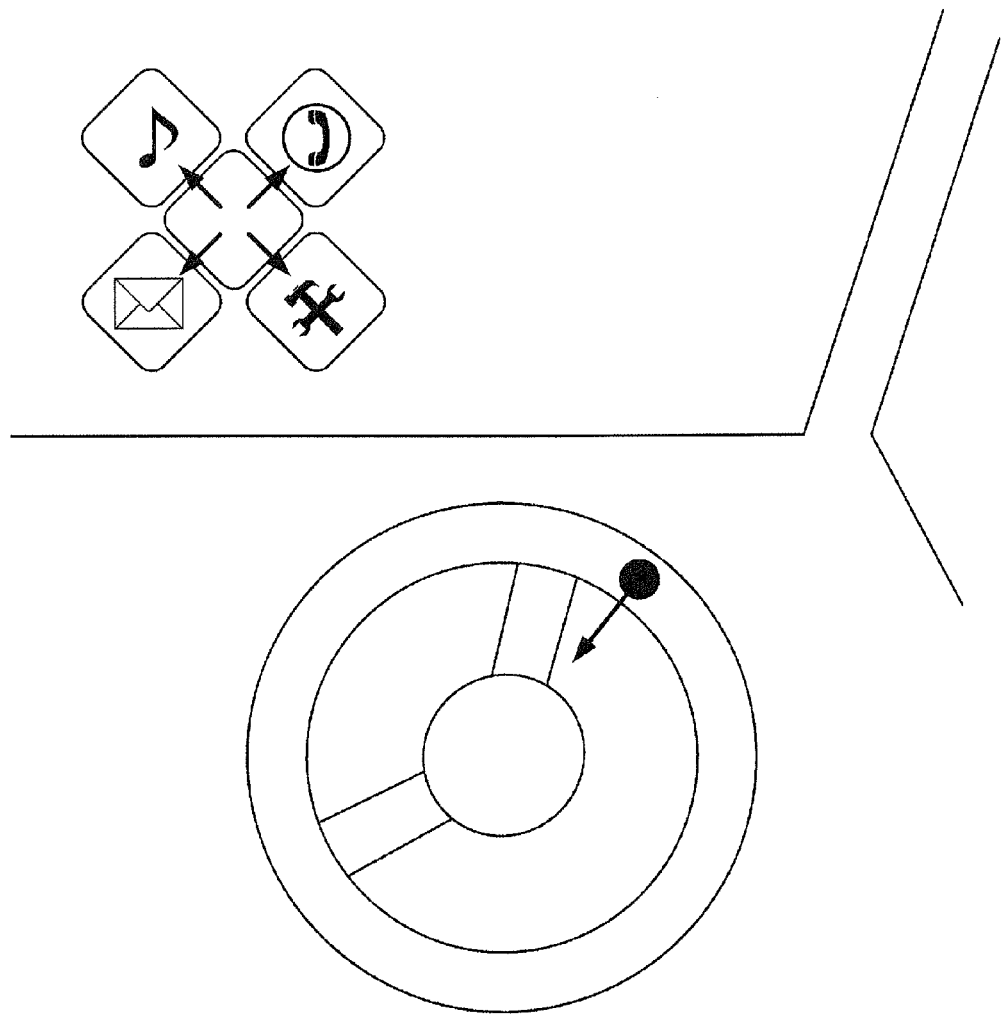
FIG. 13 is a third diagram showing a method of correcting an input operation according to the modification of the first embodiment.

In addition, a configuration may be adopted in which screen displays are changed in conjunction with a correction performance state. For example, in the example shown in FIG. 13, since the angle of the steering wheel is 45 degrees left, a correction amount by the first angle correction is 45 degrees left. In this case, an angle of an icon displayed on the screen is also simultaneously inclined to the left by 45 degrees. Accordingly, a positional relationship between a direction in which an operation is performed and an icon can be retained. Specifically, the controller 20 notifies a correction state to the vehicle-mounted terminal 30 and the vehicle-mounted terminal 30 rotates the screen display in accordance with the correction state. In this case, display means included in the vehicle-mounted terminal 30 constitutes a display unit according to the present invention.

Furthermore, in the first embodiment, while filtering of sensor information is performed using a gripping pattern, the gripping pattern need not be used and step S13 may be omitted. The object of the invention can be achieved even if filtering is not performed in step S13.

Second Embodiment

In the first embodiment, filtering of sensor information is performed using a gripping pattern. In contrast, a second embodiment is a mode in which filtering using a gripping pattern is not performed, reliability of sensor information is determined based on a variation of the sensor information, and when the reliability of the sensor information is low, acquisition of an operation input is skipped.

A configuration of a vehicular input apparatus according to the second embodiment is similar to that of the first embodiment with the exception of the vehicular input apparatus not including the input extracting unit 23 and the gripping pattern storage unit 22.

Processes performed by the vehicular input apparatus according to the second embodiment will be described with reference to FIG. 7. In the second embodiment, steps S11 and S13 are omitted. In addition, the process of step S12 is similar to that in the first embodiment.

In the second embodiment, in step S14, the input determining unit 24 compares sensor information acquired in step S12 with sensor information of a generation ago (in other words, sensor information acquired in a previous process) and acquires a variation in a total area of contact regions. When the sensor information of a generation ago is not stored, the acquired sensor information is temporarily stored, steps S15 and thereafter are skipped, and processes of a next cycle are executed.

The variation may be an area of a region that has varied (hereinafter referred to as a varied area) or a proportion of the varied area with respect to a total area. As a result, when the variation is within a predetermined range, difference information is generated using the sensor information.

A predetermined range need only be a value which enables a determination to be made on whether or not an input operation has been performed. In a case where the driver regrips the steering wheel, the varied area is significant, and in a case where the driver alters a force in which the steering wheel is gripped, the varied area is very small. In such cases, difference information is not generated and processes of steps S15 to S17 are skipped.

Processes of step S15 and thereafter are similar to those in the first embodiment.

As shown, in the second embodiment, when the variation of the contact region is outside of a predetermined range, an operation for determining an input operation is skipped. Accordingly, cases where it is obvious that an operation input has not been performed can be eliminated and erroneous recognition can be reduced.

Moreover, while an example in which a contact sensor is capable of acquiring an area of a contact region has been described above, when the contact sensor uses a point-detecting system, the area of a contact region cannot be obtained. In such a case, a determination may be made based on the number of points where contact is detected. For example, a configuration may be adopted in which difference information is not generated when the number of points where contact is detected is five or more.

Third Embodiment

Figure 14:
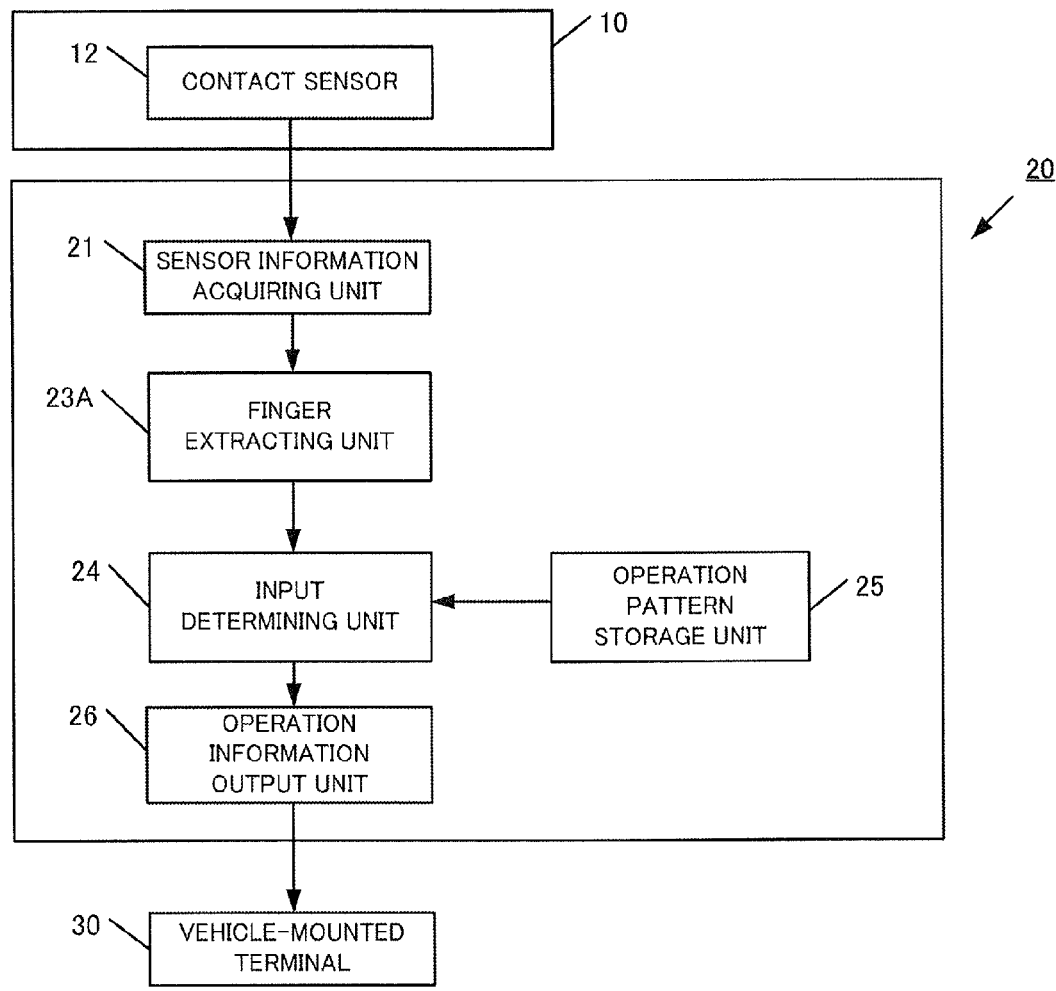
FIG. 14 is a system configuration diagram of a controller according to a third embodiment.

A third embodiment is a mode in which, instead of performing filtering of sensor information using a gripping pattern, an arrangement of fingers of the driver is estimated based on sensor information and a region corresponding to a finger not related to an input operation is filtered. FIG. 14 is a diagram showing a configuration of the controller 20 according to a third embodiment. A configuration of a vehicular input apparatus according to the third embodiment is similar to that of the first embodiment with the exception of the vehicular input apparatus not including the gripping pattern storage unit 22 and the input extracting unit 23 being replaced with a finger extracting unit 23A.

The finger extracting unit 23A is a unit for estimating an arrangement of fingers of the driver based on sensor information acquired from the contact sensor 12 and extracting only a region that conforms to a specific finger instead of performing filtering using a gripping pattern. In the third embodiment, the finger extracting unit 23A constitutes a part of an input operation acquiring unit according to the present invention in place of the input extracting unit 23.

Processes performed by the vehicular input apparatus according to the third embodiment will be described with reference to FIG. 7. In the third embodiment, step S11 is omitted. The process of step S12 is similar to that in the first embodiment.

In the third embodiment, in step S13, instead of performing filtering of sensor information using a gripping pattern, a process is performed in which a region corresponding to the thumb of the driver is detected and regions other than the detected region are filtered. A method of detecting a region corresponding to the thumb from sensor information representing a contact state of the hand is a known technique described in, for example, Japanese Patent Application Laid-open No. 2012-168595. Any kind of method may be used along as a region corresponding to the thumb can be detected.

Processes of step S14 and thereafter are similar to those in the first embodiment.

As shown, in the third embodiment, only a region corresponding to the thumb of the driver is detected and queuing is performed by acquiring difference information. By adopting such a configuration, an erroneous detection of a movement of a finger not used in an input operation can be prevented.

Moreover, while the thumb is considered a detection object in the present embodiment, any finger may be considered an object as long as the driver can freely move the finger in a state where input means is being gripped.

Fourth Embodiment

Figure 15:
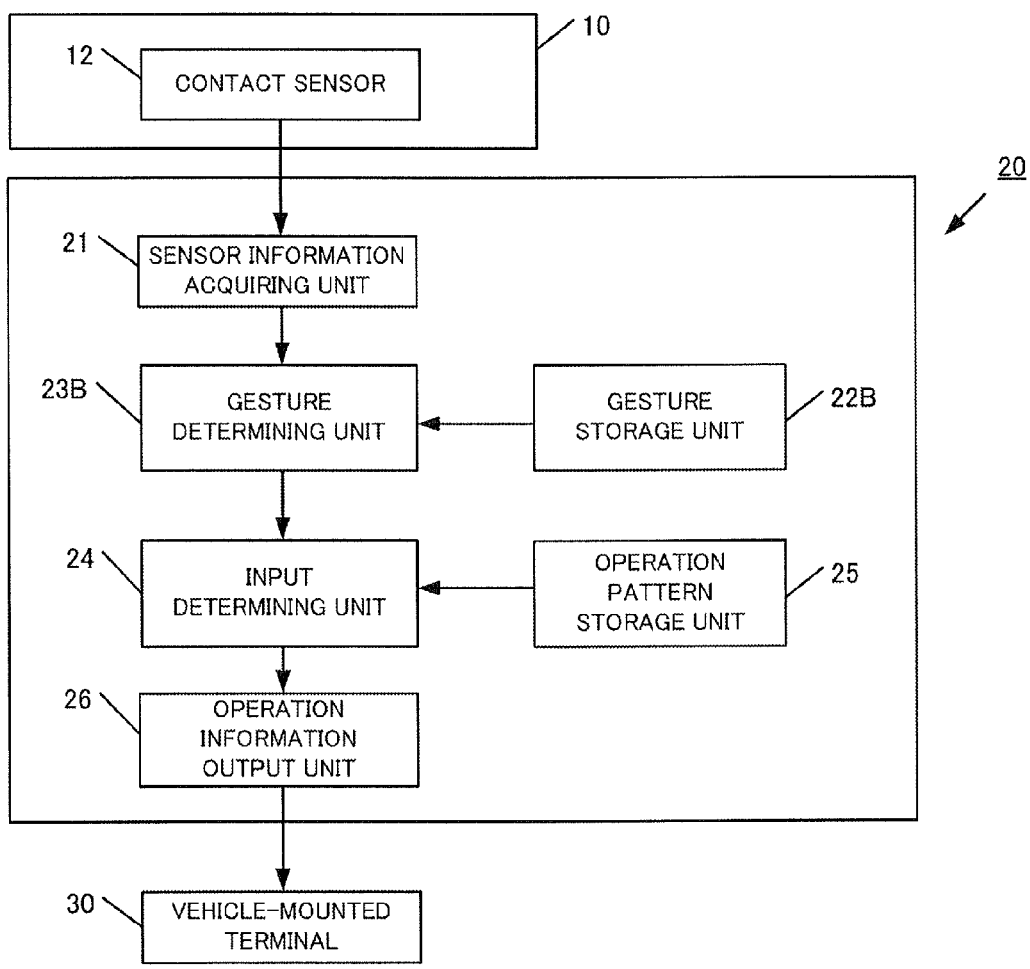
FIG. 15 is a system configuration diagram of a controller according to a fourth embodiment.

A fourth embodiment is a mode in which a special operation (a gesture) signifying a start of an input operation is defined and the controller 20 starts acquisition of an input operation only when the gesture is detected. FIG. 15 is a diagram showing a configuration of the controller 20 according to the fourth embodiment. In the fourth embodiment, the gripping pattern storage unit 22 according to the first embodiment is replaced with a gesture storage unit 22B and the input extracting unit 23 according to the first embodiment is replaced with a gesture determining unit 23B.

The gesture storage unit 22B is a unit for storing a gesture indicating a start of an input operation and a gesture indicating an end of an input operation. For example, as shown in FIG. 16, the gesture storage unit 22B respectively stores a gesture indicating a start of an input operation (hereinafter, referred to as a start gesture) and a gesture indicating an end of an input operation (hereinafter, referred to as an end gesture). A start gesture corresponds to an input pattern according to the present invention.

Moreover, while a start gesture and an end gesture are exemplified in this case by sentences, a gesture need only be information representing a temporal change of a contact region and may be stored in other formats as long as the gesture can be collated with a difference acquired from sensor information.

In addition, each gesture may be a gesture other than the exemplified gesture. For example, each gesture may be a plurality of tapping gestures, long pressing, a combination of a plurality of swiping gestures in different directions, or drawing of a graphic such as a circle or a polygon.

The gesture determining unit 23B is a unit for detecting a gesture based on sensor information acquired from the contact sensor 12 and determining a start/end of acquisition of an input operation based on the gesture. In the fourth embodiment, the gesture determining unit 23B constitutes a part of an input operation acquiring unit according to the present invention in place of the input extracting unit 23.

Figure 17:
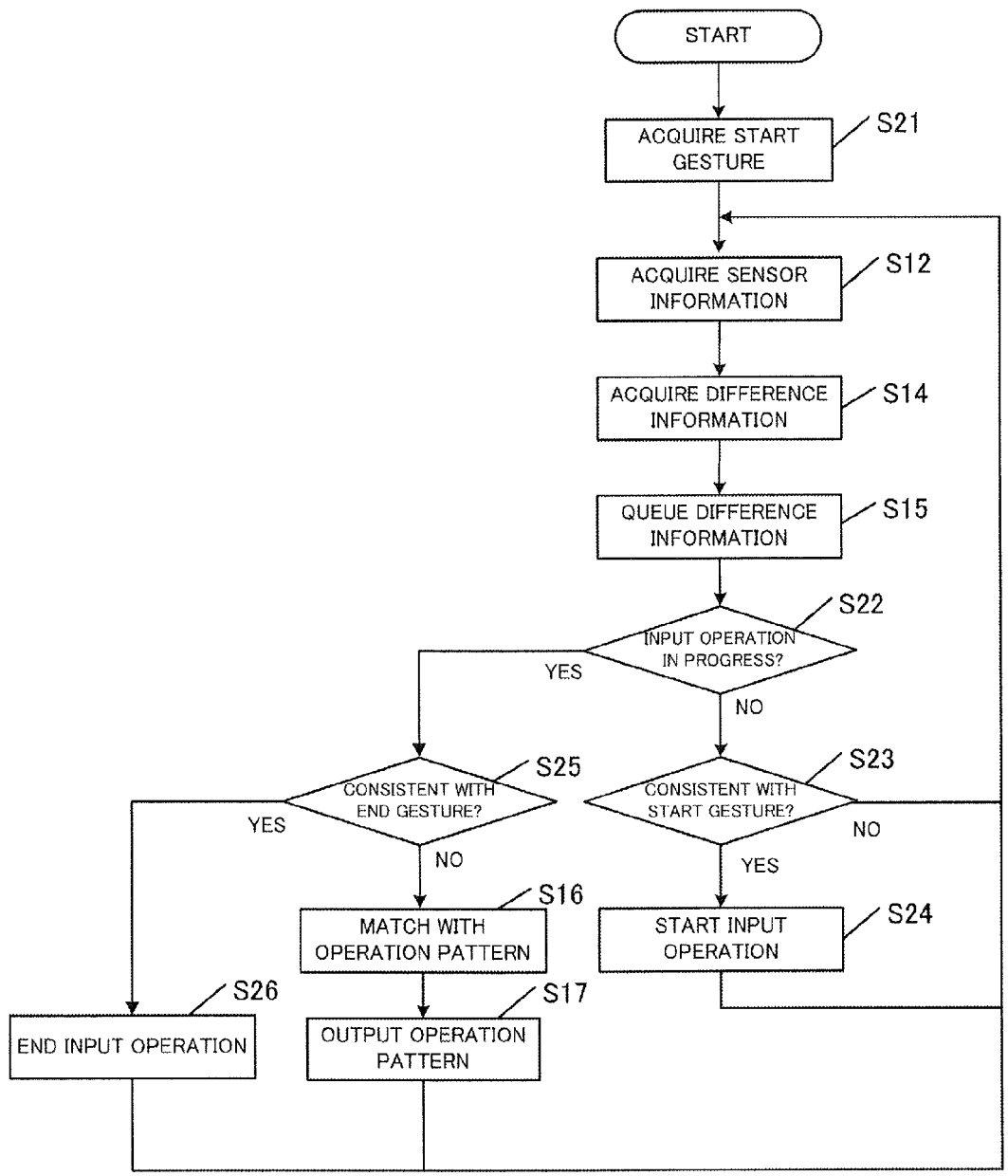
FIG. 17 is a processing flow chart of a controller according to the fourth embodiment.

Processes performed by the controller 20 according to the fourth embodiment will be described with reference to FIG. 17 showing a processing flow chart.

First, in step S21, the gesture determining unit 23B acquires a gesture stored in the gesture storage unit 22B and temporarily stores the gesture. Since processes of steps S12 to S15 are similar to those of the first embodiment, a description thereof will be omitted.

Next, in step S22, the gesture determining unit 23B determines whether or not a current status is "input operation in progress". A status is a variable representing any of "input operation in progress" and "standing by", and an initial value is set to "standing by". In other words, in an initial process, a determination result is No and a transition is made to the process of step S23.

In step S23, the gesture determining unit 23B refers to a queue and determines whether or not an operation corresponding to the acquired gesture has been performed. As a result, when an operation corresponding to the start gesture is included in the queue (for example, a double tap operation), a transition is made to step S24 and the status is changed to "input operation in progress". In doing so, the fact that a state is entered where an input operation can be accepted can be notified to the driver by a sound effect, a display, vibration, or the like through output means (not shown).

When it is determined in step S22 that an input operation is in progress, a transition is made to step S25.

Step S25 is a step of determining whether or not an operation corresponding to the end gesture has been performed. Since a content of the process is similar to that of step S23, a detailed description will be omitted. When the end gesture has been inputted, a transition is made to step S26 and the status is changed to "standing by". When the end gesture has not been inputted, a transition is made to step S16 and an input operation is acquired by a similar method to the first embodiment.

According to the fourth embodiment, since acquisition of an input operation is started only when an explicit gesture is performed, an erroneous recognition of an input operation can be reduced.

Moreover, while an end gesture is defined in the present example, the status can be restored to "standing by" upon a lapse of a predetermined period of time or when some kind of an input operation is performed.

(Modifications)

The embodiments described above simply represent examples and various modifications may be made to the present invention without departing from the spirit and scope thereof.

For example, while the steering wheel has been used as the grip portion in the respective embodiment, any kind of device may be used as long as an operator uses the device by gripping the device. For example, a control stick or a master controller may be used.

In addition, while the contact sensor 12A and the contact sensor 12B are arranged separated from each other in the respective embodiments, lengths of the respective contact sensors may be extended so that the contact sensors are arranged without a gap therebetween.

Furthermore, while an end timing of an input operation has not been explicitly shown in the first to third embodiments, a return can be made to a standby state on the assumption that an input operation has ended when some kind of an input operation is performed or upon a lapse of a predetermined period of time. Alternatively, an end of an input operation can be determined based on other triggers.

In addition, while an example in which four directions including up, down, left, and right are inputted has been shown in the description of the embodiments, there may be two input directions or input of free directions may be allowed such as in the case of a pointing device. Furthermore, a specific instruction such as a shortcut to an application may be assigned to a specific input operation.

In addition, when a rotational angle of the steering wheel is acquired and the rotational angle exceeds a predetermined value, the acquisition of sensor information may be aborted to prevent an input operation from being accepted. Accordingly, a rate of erroneous recognition of an input operation can be reduced.

Furthermore, while difference information is generated from collected sensor information and an input operation is acquired by queuing the difference information in the description of the embodiments, other methods may be used if an input operation can be acquired from pieces of sensor information acquired at different times.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-008385, filed on Jan. 21, 2013, which is hereby incorporated by reference herein in its entirety.

REFERENCE SIGNS LIST

10: STEERING WHEEL
12: CONTACT SENSOR
20: CONTROLLER
21: SENSOR INFORMATION ACQUIRING UNIT
22: GRIPPING PATTERN STORAGE UNIT
23: INPUT EXTRACTING UNIT
24: INPUT DETERMINING UNIT
25: OPERATION PATTERN STORAGE UNIT
26: OPERATION INFORMATION OUTPUT UNIT
30: VEHICLE-MOUNTED TERMINAL

The invention claimed is:

1. A user interface apparatus, comprising:
a grip portion to be gripped by an operator;
a contact sensor which is arranged on a surface of the grip portion and which detects a contact position;
a gripping pattern storage unit that stores a gripping pattern representing a contact state, in which the operator grips the grip portion, and which does not correspond to an input operation; and
a processor programmed to:
during at least two different times:
receive sensor information outputted from the contact sensor, and
generate bit map information corresponding to the received sensor information; and
extract a region that does not conform to the stored gripping pattern for each piece of generated bit map information acquired at the at least two different times,
acquire a difference between a plurality of the extracted regions, and
determine that an input operation corresponding to the gripping pattern has been performed when the difference conforms to the gripping pattern, wherein the gripping pattern storage unit acquires the gripping pattern by learning.

2. The user interface apparatus according to claim 1, wherein the gripping pattern is a predetermined pattern representing a temporal change of a number of regions or a temporal change of the position of a region in which the contact sensor detects contact.

3. The user interface apparatus according to claim 1, wherein the processor is further programmed to:
extract a region that corresponds to a specific finger of the operator for each piece of generated bit map information acquired at the at east two different times,
acquire a difference between a plurality of the extracted regions that correspond to the specific finger of the operator, and
collate the difference between the plurality of extracted regions that correspond to the specific finger of the operator with the predetermined pattern.

4. The user interface apparatus according to claim 1, wherein the processor is further programmed to: determine that an input operation is not performed when a variation in a total area of a region, in which the contact sensor detects contact, within a unit time is outside a predetermined range.

5. The user interface apparatus according to claim 1, wherein the processor is further programmed to: determine that an input operation is not performed when an increase in the number of regions, in which the contact sensor detects contact, within the unit time is greater than a predetermined number.

6. The user interface apparatus according to claim 1, wherein
the storage unit stores a start pattern and a main pattern, and
the processor is further programmed to: collate the difference between pieces of bit map information with the start pattern, and collate the difference with the main pattern in a subsequent predetermined period after the difference has been determined to conform to the start pattern.

7. The user interface apparatus according to claim 1, wherein the processor is further programmed to:
store, in the storage unit, an external signal corresponding to an input operation that has been performed, and
transmit the external signal corresponding to an input operation that has been performed to the external device.

8. The user interface apparatus according to claim 1, wherein the gripping portion is a steering wheel of a vehicle.

9. The user interface apparatus according to claim 8, wherein the processor is further programmed to:
acquire a rotational angle of the gripping portion, wherein the input operation is an operation for specifying a direction, and
correct a direction of a determined input operation based on the acquired rotational angle of the grip portion and a detection result of the contact sensor.

10. The user interface apparatus according to claim 9, further comprising: a display, wherein the processor is further programmed to control the display a correction state of an input operation.

11. An input acquiring method performed by a user interface apparatus including a grip portion to be gripped by an operator, a contact sensor which is arranged on a surface of the grip portion and which detects a contact position, and a gripping pattern storing unit that stores a gripping pattern representing a contact state, in which the operator grips the grip portion, and which does not correspond to an input operation, the input acquiring method comprising:

during at least two different times:
receiving sensor information outputted from the contact sensor; and
generating bit map information corresponding to the received sensor information;

extracting a region that does not conform to the stored gripping pattern for each piece of generated bit map information acquired at the at least two different times, acquiring a difference between pieces of bit map information respectively acquired at the at least two different times, and determining that an input operation corresponding to the gripping pattern has been performed when the difference conforms to the gripping pattern, wherein the gripping pattern storage unit acquires the gripping pattern by learning.

12. A vehicular input apparatus, comprising:
a steering wheel to be gripped by an operator;
a contact sensor which is arranged on a surface of the steering wheel and which detects a contact position;
a gripping pattern storage unit that stores a gripping pattern representing a contact state, in which the operator grips the grip portion, and which does not correspond to an input operation; and
a processor programmed to:
during at least two different times:
receive sensor information outputted from the contact sensor,
generate bit map information corresponding to the received sensor information;
extract a region that does not conform to the stored gripping pattern for each piece of generated it map information acquired at the at least two different times,
acquire a difference between a plurality of the extracted regions, and
determine that an input operation corresponding to the gripping pattern has been performed when the difference conforms to the gripping pattern, wherein the gripping pattern storage unit acquires the gripping pattern by learning.

* * * * *